United States Patent
El-Hanany et al.

(10) Patent No.: US 8,530,784 B2
(45) Date of Patent: Sep. 10, 2013

(54) METHOD AND SYSTEM OF MACHINING USING A BEAM OF PHOTONS

(75) Inventors: Uri El-Hanany, Rehovot (IL); Arie Shahar, Moshave Magshimim (IL); Alex Tsigelman, Petach Tikva (IL); Zeev Gutman, Mordechi (IL)

(73) Assignee: Orbotech Ltd., Yavne (IL)

( * ) Notice: Subject to any disclaimer, the term of this patent is extended or adjusted under 35 U.S.C. 154(b) by 1249 days.

(21) Appl. No.: 12/020,604

(22) Filed: Jan. 28, 2008

(65) Prior Publication Data

US 2008/0185367 A1    Aug. 7, 2008

Related U.S. Application Data

(60) Provisional application No. 60/899,129, filed on Feb. 1, 2007.

(51) Int. Cl.
*B23K 26/14* (2006.01)
*B23K 26/36* (2006.01)

(52) U.S. Cl.
USPC ............ 219/121.68; 219/121.69; 219/121.76; 219/121.84; 250/370.01

(58) Field of Classification Search
USPC ............. 219/121.76, 121.77, 121.68–121.72; 438/462, 463; 250/370.01–370.15, 591; 378/98.8
See application file for complete search history.

(56) References Cited

U.S. PATENT DOCUMENTS

| | | | | |
|---|---|---|---|---|
| 3,262,122 A | * | 7/1966 | Fleisher et al. | 430/322 |
| 3,453,097 A | * | 7/1969 | Hafner | 65/112 |
| 4,347,437 A | * | 8/1982 | Mourou | 250/214.1 |
| 4,497,692 A | * | 2/1985 | Gelchinski et al. | 205/92 |
| 4,615,967 A | * | 10/1986 | Tenhover et al. | 430/270.13 |
| 5,361,271 A | * | 11/1994 | Takiguchi et al. | 372/46.01 |
| 5,586,132 A | * | 12/1996 | Levy | 372/23 |
| 5,817,271 A | * | 10/1998 | Congleton et al. | 264/400 |
| 6,156,030 A | * | 12/2000 | Neev | 606/10 |
| 6,162,707 A | * | 12/2000 | Dinh et al. | 438/487 |
| 6,358,243 B1 | * | 3/2002 | Esterowitz et al. | 606/10 |
| 6,372,536 B1 | * | 4/2002 | Fischer et al. | 438/46 |
| 6,670,576 B2 | * | 12/2003 | Troitski et al. | 219/121.69 |
| 6,700,096 B2 | * | 3/2004 | Yamazaki et al. | 219/121.73 |
| 6,992,026 B2 | * | 1/2006 | Fukuyo et al. | 438/797 |
| 7,149,374 B2 | * | 12/2006 | Lagakos et al. | 385/12 |
| 7,157,038 B2 | * | 1/2007 | Baird et al. | 264/400 |
| 7,170,675 B2 | * | 1/2007 | Brooker | 359/385 |
| 7,566,635 B2 | * | 7/2009 | Fujii et al. | 438/462 |
| 7,790,533 B2 | * | 9/2010 | Tanaka et al. | 438/166 |
| 7,800,071 B2 | * | 9/2010 | Shahar et al. | 250/370.01 |
| 2005/0088654 A1 | * | 4/2005 | Hu et al. | 356/432 |
| 2006/0082003 A1 | * | 4/2006 | Shizuno | 257/787 |
| 2007/0207594 A1 | * | 9/2007 | Tamura | 438/463 |

* cited by examiner

*Primary Examiner* — Samuel M Heinrich
(74) *Attorney, Agent, or Firm* — Shichrur & Co.

(57) ABSTRACT

Some embodiments include methods, and systems of machining using a beam of photons. In some embodiments, a machining method to remove material in a machined region may include reducing transparency of the region to at least a predefined wavelength by irradiating the region with a first beam of photons to induce generation of free electrons in the region; and machining the region with a second beam of photons having the predefined wavelength. Other embodiments are described and claimed.

26 Claims, 4 Drawing Sheets

METHOD AND SYSTEM OF MACHINING USING A BEAM OF PHOTONS

CROSS REFERENCE

This application claims the benefit of U.S. Provisional Patent Application No. 60/899,129 filed on Feb. 1, 2007 and entitled "Laser Machining System", the entire disclosure of which is incorporated herein by reference.

FIELD

Some embodiments relate to machining, e.g., machining a region by selectively removing material from the region, and in particular to machining the region using a beam of photons.

BACKGROUND

Machining systems may be used to selectively remove material from one or more machined regions.

Some machining systems include a laser source to irradiate the machined region with a laser beam ("laser machining systems"). In order to perform the machining with laser machining systems, it is required that at least some of the energy of the laser beam is sufficiently absorbed by the machined region to ablate the material in the machined region.

In order for at least some of the energy of the laser beam to be absorbed by the machined region, the material must be at least partly opaque to the wavelength of the laser beam. Therefore, it may be difficult, expensive or even practically impossible to use the laser source for machining materials, which are substantially transparent to the laser beam.

SUMMARY

Some embodiments provide a method, apparatus, and/or system of machining using a beam of photons.

Some embodiments enable machining a region of a material, which is substantially transparent to a wavelength of the machining beam of photons.

In some embodiments, a machining method to remove material in a machined region may include reducing transparency of the region to at least a predefined wavelength by irradiating the region with a first beam of photons to induce generation of free electrons in the region; and machining the region with a second beam of photons having the predefined wavelength.

In some embodiments, reducing the transparency may include reducing the transparency of the region from a first transparency level, in which the region is substantially transparent to the wavelength, to a second transparency level, in which the region is to absorb at least part of the second beam of photons.

In some embodiments, irradiating the region with the first beam of photons may include irradiating the region with a beam of photons having energy equal to or greater than an energy band gap of the material.

In some embodiments, the method may include jointly directing the first and second beams to the region.

In some embodiments, the method may include jointly inserting the first and second beams into a column of water directed to the region.

In some embodiments, the method may include combining the first and second beams by a dichroic mirror.

In some embodiments, the method may include individually directing the first and second beams to first and second, at least partially overlapping, respective portions of the region.

In some embodiments, at least one of the first and second beams may include a pulsed beam.

In some embodiments, the first and second beams may include first and second interlaced pulsed beams.

In some embodiments, machining the region may include machining a first layer of the material on top of a second layer of another material, wherein the first layer is substantially transparent to the wavelength, and wherein the second layer is at least partially opaque to the wavelength.

In some embodiments, the first layer may include cubic zinc sulfide, and the second layer may include cadmium zinc telluride.

In some embodiments, machining the region with a second beam of photons may include machining the region with a laser beam.

In some embodiments, the material may include a semiconductor.

In some embodiments, the semiconductor may include cubic-zinc-sulfide.

In some embodiments, the first beam has a wavelength of no more than 350 nanometers.

In some embodiments a machining system to remove material in a machined region may include a first beam source to generate a first beam of photons irradiate the region, wherein the first beam is adapted to reduce transparency of the region to at least a predefined wavelength by inducing generation of free electrons in the region; and a second beam source to generate a second beam of photons having the predefined wavelength to machine the region.

In some embodiments, the first beam is adapted to reduce the transparency of the region from a first transparency level, in which the region is substantially transparent to the wavelength, to a second transparency level, in which the region is to absorb at least part of the second beam of photons.

In some embodiments, the first beam includes a beam of photons having energy equal to or greater than an energy band gap of the material.

In some embodiments, the system may include a combiner to jointly direct the first and second beams to the region.

In some embodiments, the combiner may include a water-beam combiner to jointly insert the first and second beams into a column of water directed to the region.

In some embodiments, the combiner may include a dichroic mirror.

In some embodiments, at least one of the first and second beams may include a pulsed beam.

In some embodiments, the first and second beams include first and second interlaced pulsed beams.

In some embodiments, the region may include a first layer of the material on top of a second layer of another material, wherein the first layer is substantially transparent to the wavelength, and wherein the second layer is at least partially opaque to the wavelength.

In some embodiments, the first layer may include cubic zinc sulfide, and the second layer may include cadmium zinc telluride.

In some embodiments, the second beam source may include a laser.

In some embodiments, the material may include a semiconductor.

In some embodiments, the semiconductor may include cubic-zinc-sulfide.

In some embodiments, the first beam has a wavelength of no more than 350 nanometers.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Further, reference numerals may be repeated among the figures or within a figure to indicate corresponding or analogous elements. Moreover, some of the blocks depicted in the drawings may be combined into a single function. The figures are listed below.

DETAILED DESCRIPTION

In the following detailed description, numerous specific details are set forth in order to provide a thorough understanding of some demonstrative embodiments. However, some embodiments may be practiced without these specific details. In other instances, well-known methods, procedures, components, units and/or circuits have not been described in detail so as not to obscure the discussion. It is intended that the embodiments and figures disclosed herein be considered illustrative rather than restrictive.

Portions of the discussion herein utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used herein to describe two or more items; for example, a plurality of items includes two or more items.

Some demonstrative embodiments may be implemented to machine a material using a beam of photons ("the machining beam"), e.g., a laser beam, even if the material is ordinarily substantially transparent to a wavelength of the beam.

In some demonstrative embodiments, a transparency of the material in a machined region may be altered, e.g., reduced, to a level in which the material in the machined region may be substantially opaque to the wavelength of the machining beam, such that at least some of the energy of the machining beam may be absorbed by the material.

In some demonstrative embodiments, the transparency of the material may be altered by inducing the generation of free electrons within the machined region, e.g., at least temporarily, such that the machined region may become, e.g., at least temporarily, substantially opaque to the machining beam regardless, for example, of the wavelength of the machining beam. As a result, the machined region may absorb at least some of the energy of the machining beam at an amount sufficient to ablate the material of the machined region.

Figure 1:
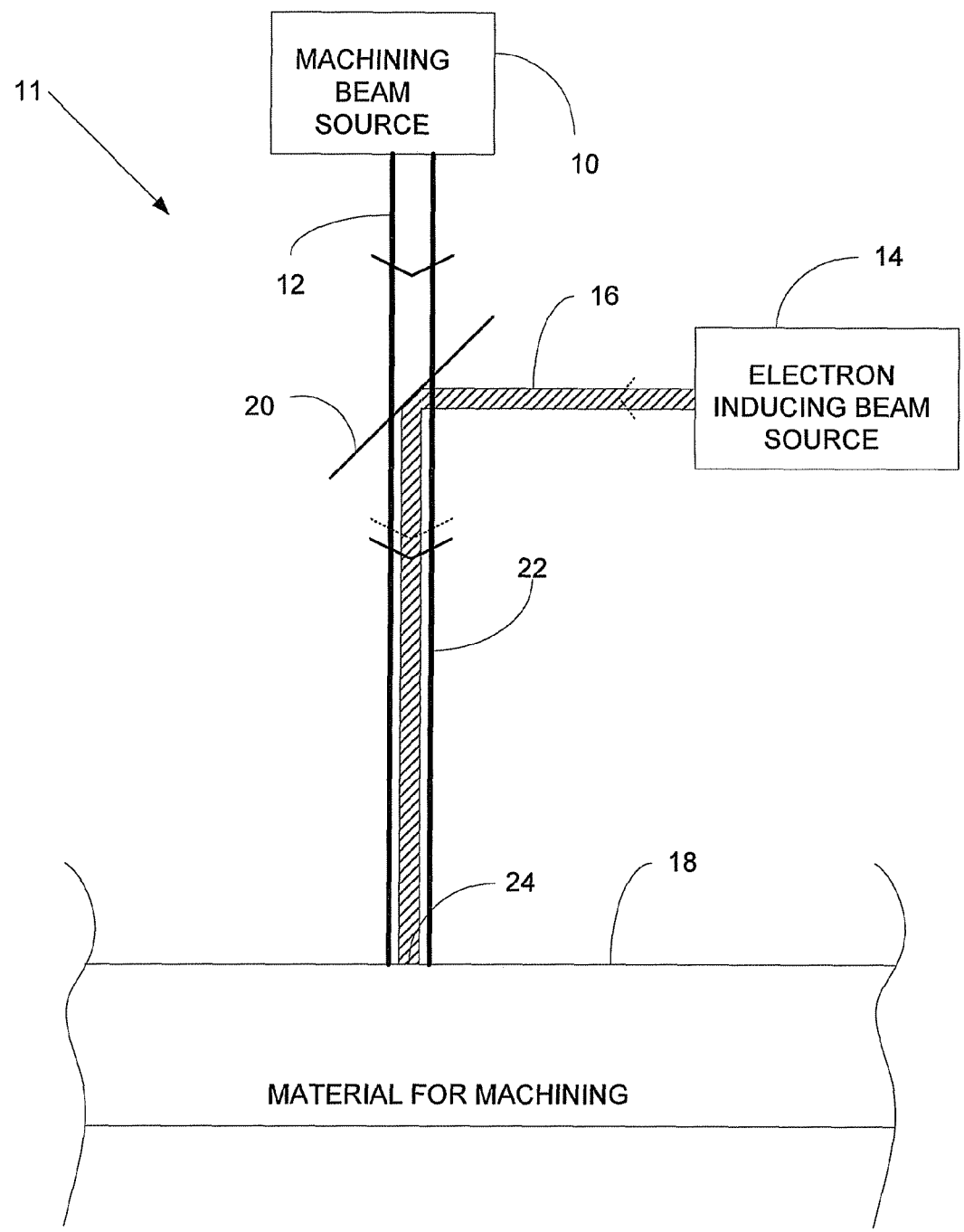
FIG. 1 is a schematic illustration of a machining system in accordance with one demonstrative embodiment.

FIG. 1 schematically illustrates a machining system 11 in accordance with some demonstrative embodiments. In some demonstrative embodiments, machining system 11 may be adapted to remove, e.g., selectively remove, material 18 in a machined region 24, as described in detail below.

In some demonstrative embodiments, material 18 may include a semiconductor. However, in other embodiments material 18 may include any other material, e.g., an insulator.

In some demonstrative embodiments, system 11 may include a beam source 10 ("the machining beam source") to generate a beam of photons 12 ("the machining beam") intended to machine region 24. In one non-limiting example, beam source 10 may include a laser beam source, and beam 12 may include a laser beam. In other embodiments, beam source 10 may include any other suitable beam source to generate beam 12 of any other suitable type.

In some demonstrative embodiments, it may be required that at least some of the energy of beam 12 is absorbed by region 24, e.g., in order to machine region 24. However, in some embodiments, optical properties of material 18 may not enable machining of material 18 using solely beam 12. For example, material 18 may be substantially transparent to a wavelength of beam 12, such that beam 12 may not ordinarily be sufficiently absorbed by material 18 to machine region 24. In some embodiments, a beam source, e.g., beam source 10, capable of generating a machining beam, e.g., beam 12, having a wavelength adapted to be sufficiently absorbed by material 18 may not be available, and/or may be very expensive.

In some demonstrative embodiments, system 11 may allow machining region 24 even if material 18 is substantially transparent to the wavelength of beam 12. For example, system 11 may allow machining region 24, e.g., regardless of a wavelength of beam 12, e.g., as described in detail below In some demonstrative embodiments, system 11 may also include a beam source 14 ("the electron inducing beam source") to generate a beam of photons 16 ("the electron-inducing beam") to irradiate region 24. Beam 16 may be adapted to reduce the transparency of region 24 at least to wavelength 12, by inducing generation of free electrons in region 24. In one example, beam 16 may be adapted to reduce, e.g., at least temporarily, the transparency of region 24 from a first transparency level, in which region 24 is substantially transparent to the wavelength of beam 12, to a second transparency level, in which region 24 is to absorb at least part of beam 12, e.g., as described in detail below.

In some demonstrative embodiments, system 11 may also include a combiner, e.g., a dichroic mirror 20, to jointly direct beams 12 and 16 to irradiate region 24, e.g., as a combined beam 22 including photons of both beams 12 and 16. For example, mirror 22 may be substantially transparent to the wavelength of beam 12, and may reflect beam 16, e.g., if beam 16 is generated substantially in parallel to region 24 and beam 12 is generated substantially perpendicular to region 24. Any other suitable dichroic mirror and/or combiner, e.g., an optical fibers combiner, may be implemented, e.g., according to a configuration and/or arrangement of sources 10 and/or 14.

In some demonstrative embodiments, beam source 14 may be adapted to generate beam 16 having energy equal to or greater than a band gap of material 18, e.g., in order to induce the generation of free electrons in region 24. For example, photons of beam 16 having energy equal to or greater than a band gap of material 18 may be absorbed by material 18 of region 24 to transfer electrons of region 24 from a valence band to a conduction band, thereby to generate free electrons in the material of region 24.

In some demonstrative embodiments, the free electrons induced by the photons of beam 16 may reduce, e.g., at least temporarily, the transparency of region 24, e.g., from being ordinarily transparent to the wavelength of beam 12, to being substantially opaque to the wavelength of beam 12 as well as to other wavelengths. As a result, the photons of beam 12 may be sufficiently absorbed to machine region 24.

In one non-limiting example, material 18 may include cubic zinc sulfide, having a band gap of approximately 3.5 electron Volt (eV). According to this example, beam source 14 may be adapted to generate beam 16 having energy of at least 3.5 eV. For example, beam source 14 may be adapted to generate beam 16 having a wavelength of no more than approximately 350 nanometers (nm). In other embodiments, beam source 14 may be adapted to generate beam 16 having any other suitable energy and wavelength, which may be based on any other suitable band gap of material 18.

In some demonstrative embodiments, at least one of beams 12 and/or 16 may include a pulsed beam, e.g., as described below. However, embodiments of the invention are not limited in this respect in other embodiments both beams 12 and 16 may include continuous beams.

In some demonstrative embodiments, beams 12 and 16 may include interlaced pulsed beams. For example, beam sources 10 and 14 may be capable of generating interlaced pulses of beams 12 and 16, respectively, such that combined beam 22 may include a sequence of the pulses of beam 12 interlaced with a sequence of the pulses of beam 16. For example, a pulse of beam 16 may irradiate region 24 to "precondition" region 24 by generating the free electrons in region 24, e.g., prior to a consecutive pulse of beam 12 irradiating region 24. As a result, region 24 may be preconditioned to absorb the pulse of beam 12. In some example, sources 10 and/or 14 may be configured to interlace the pulses of beams 12 and 16 according to any suitable timing scheme, e.g., a timing scheme adapted to optimize the absorption of the pulses of beam 12 in region 24.

In one non-limiting example, beam source 14 may include a laser beam source, and beam 16 may include a laser beam. In other embodiments, beam source 14 may include any other suitable beam source, e.g., an arc source, and arc lamp, or any other suitable electric lamp or source, to generate beam 12 of any other suitable type.

Although in some non-limiting examples, beams 12 and 16 include collimated beams, e.g., as illustrated in FIG. 1, in other embodiments beams 12 and/or may include non-collimated beams, for example, focused beams guided along any suitable radiation guide/s (not shown), and/or beams focused by any suitable focusing element/s, e.g., one or more lenses (not shown).

Although in some embodiments, e.g., as described above with reference to FIG. 1, beams 12 and 16 may be jointly directed, e.g., using dichroic mirror 20, to region 24, in other embodiments beams 12 and 16 may be individually directed to region 24, e.g., as described below with reference to FIG. 2.

Figure 2:
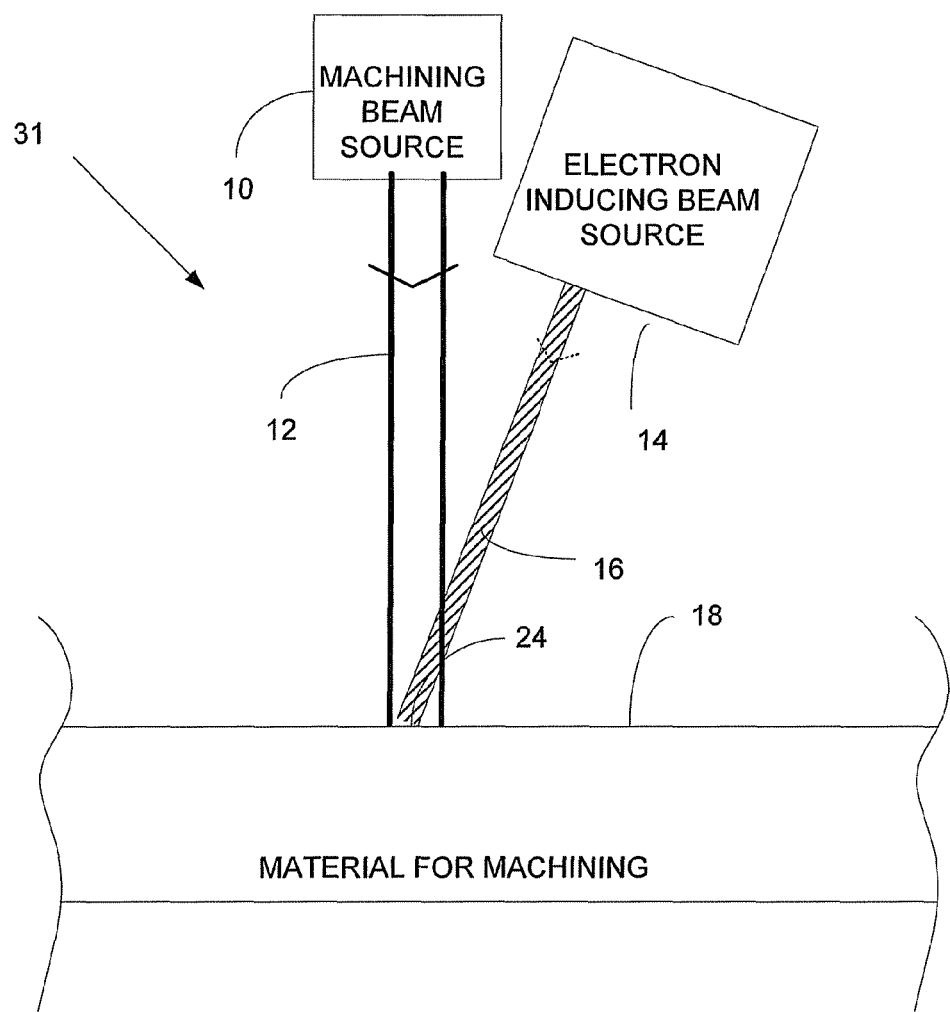
FIG. 2 is a schematic illustration of a machining system in accordance with another demonstrative embodiment.

FIG. 2 schematically illustrates a machining system 31 in accordance with another demonstrative embodiment. System 31 may include beam source 10 to generate beam 12, and beam source 14 to generate beam 16, e.g., as described above with reference to FIG. 1.

As shown in FIG. 2, in some demonstrative embodiments, beams 12 and 16 may be individually directed to irradiate region 24 of material 18, e.g., without combining beams 12 and 16.

In some embodiments, beams 16 and 12 may be directed to irradiate overlapping portions of region 24. In one example, a portion of region 24 irradiated by beam 16 may substantially entirely overlap a portion irradiated by beam 12. In another embodiments, the portion of region 24 irradiated by beam 16 may only partially overlap the portion of region 12. Accordingly, only the portion irradiated by beam 16 may be machined by beam 12.

Figure 3:
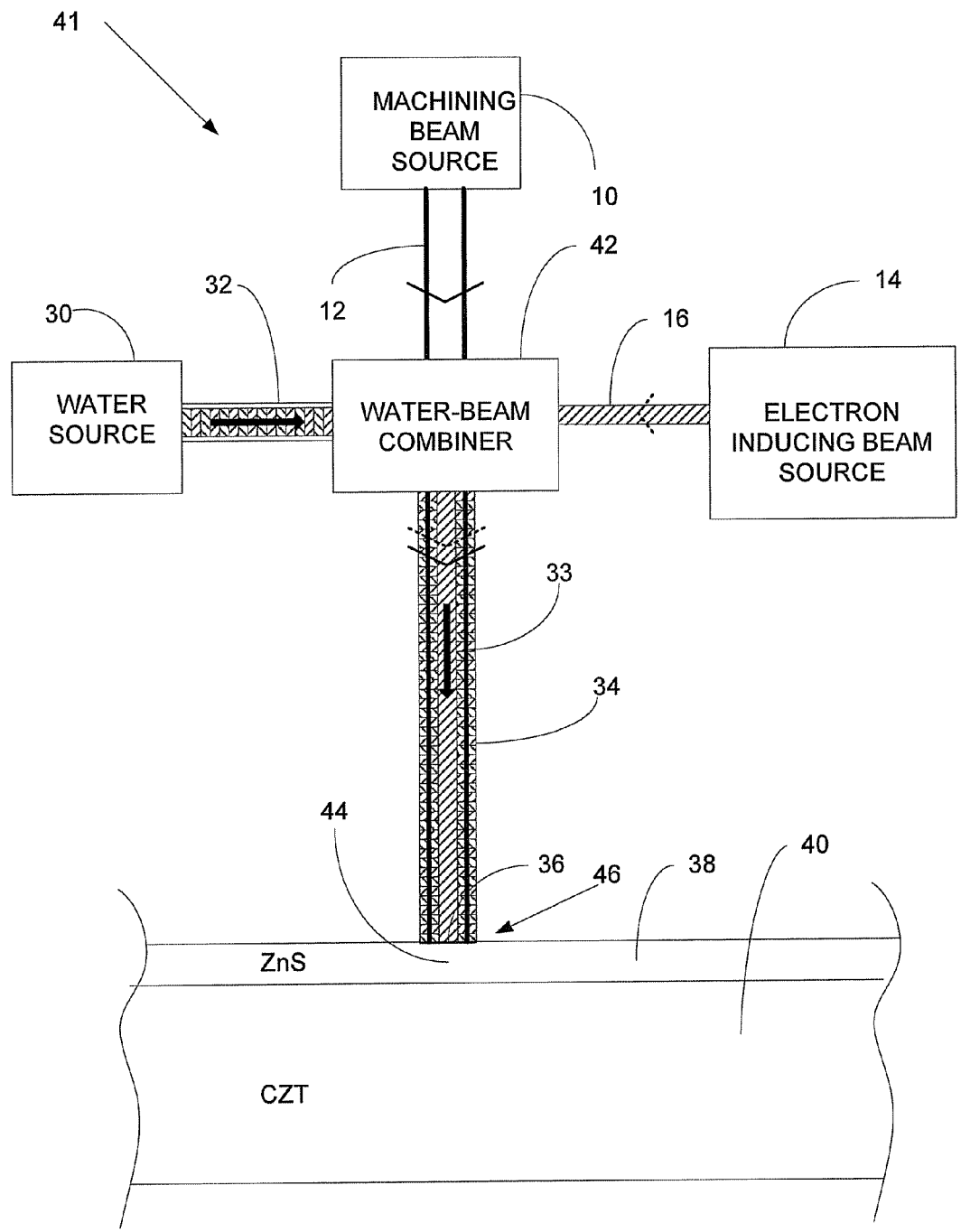
FIG. 3 is a schematic illustration of a machining system in accordance with another demonstrative embodiment.

Reference is now made to FIG. 3, which schematically illustrates a machining system 41 in accordance with another embodiment. System 41 may include beam source 10 to generate beam 12, and beam source 14 to generate beam 16, e.g., as described above with reference to FIG. 1.

In some demonstrative embodiments, system 41 may be implemented to machine a first layer of a first material, which may be disposed over a second layer of a second material, wherein the first layer is substantially transparent to the wavelength of beam 12, and the second layer is at least partially opaque to the wavelength of beam 12. In one example, system 41 may be implemented to machine a cadmium zinc telluride (CZT) substrate 40 having a top layer 38 of cubic zinc sulfide (ZnS).

In some demonstrative embodiments, system 41 may include a water-beam combiner 42 to jointly direct beams 12 and 16, via a column of water 34, to a region 36 of a surface of layer 38. For example, water-beam combiner 42 may receive a suitable amount of water 32 from any suitable water source 30, generate water column 34, e.g., a thin water column directed to region 36, and jointly insert into column 34 beams 12 and 16 as a combined beam 33, e.g., analogous to beam 22 of FIG. 1. Water column 34 may be implemented as a liquid fiber-optic to direct combined beam 33 to region 36.

In some embodiments, beam source 10 may be adapted to generate beam 12 having a wavelength of approximately 800 nm or less, e.g., assuming CZT substrate 40 has a band gap of approximately 1.55 eV. In one example, beam source 10 may be adapted to generate beam 12 having a wavelength of 532 nm, which may be sufficiently absorbed to machine CZT substrate 40. However, layer 38 may be ordinarily substantially transparent to the wavelength of beam 12, e.g., since a band gap of layer 38 may correspond to a wavelength, e.g., 350 nm, which is significantly lower than the wavelength of beam 12. Accordingly, the wavelength of beam 12 may be insufficient for ordinarily machining layer 38.

In some demonstrative embodiments, beam source 14 may be adapted to generate beam 16 having a wavelength which is equal to or shorter than the wavelength corresponding to the band gap of layer 38, in order for example, to precondition region 36 of layer 38 to absorb beam 12, e.g., by inducing the generation of free electrons in region 36 as described above. In one example, source 14 may include an arc source, e.g., a Xenon arc source, configured to generate beam 16 having a wavelength of no more than approximately 350 nm.

Combiner 42 may combine beams 12 and 16 into combined beam 33, e.g., having photons of both the wavelengths 532 nm ("the 532 nm photons") and 350 μm ("the 350 nm photons"). Combiner 42 may insert combined beam 33 into water column 34, such that the 350 nm and 532 nm photons are both directed to region 36 of the surface of layer 38. As described above, the 350 nm photons may be absorbed by layer 38 to induce the generation of free electrons at region 36. The free electrons may reduce the transparency of layer 38 at region 36 to a level in which region 36 may absorb the 532 nm photons. The absorption of the 532 nm photons at region 36 may ablate region 36, resulting in machining region 36 of layer 38. Once region 36 has been machined, one or more other portions, e.g., a remainder 44 of layer 38 beneath region 36, may be similarly machined, for example, by absorbing the 350 nm photons, generating free electrons, and absorbing the 532 nm photons.

The process described above may be used to selectively machine a desired section 46 of layer 38 covering CZT substrate 40.

In some embodiments, CZT substrate 40 may be machined using only beam 12, e.g., once section 46 has been machined. For example, beam source 14 may be switched off, such that only the 530 nm photons of beam 12 are directed to machine CZT substrate 40.

Figure 4:
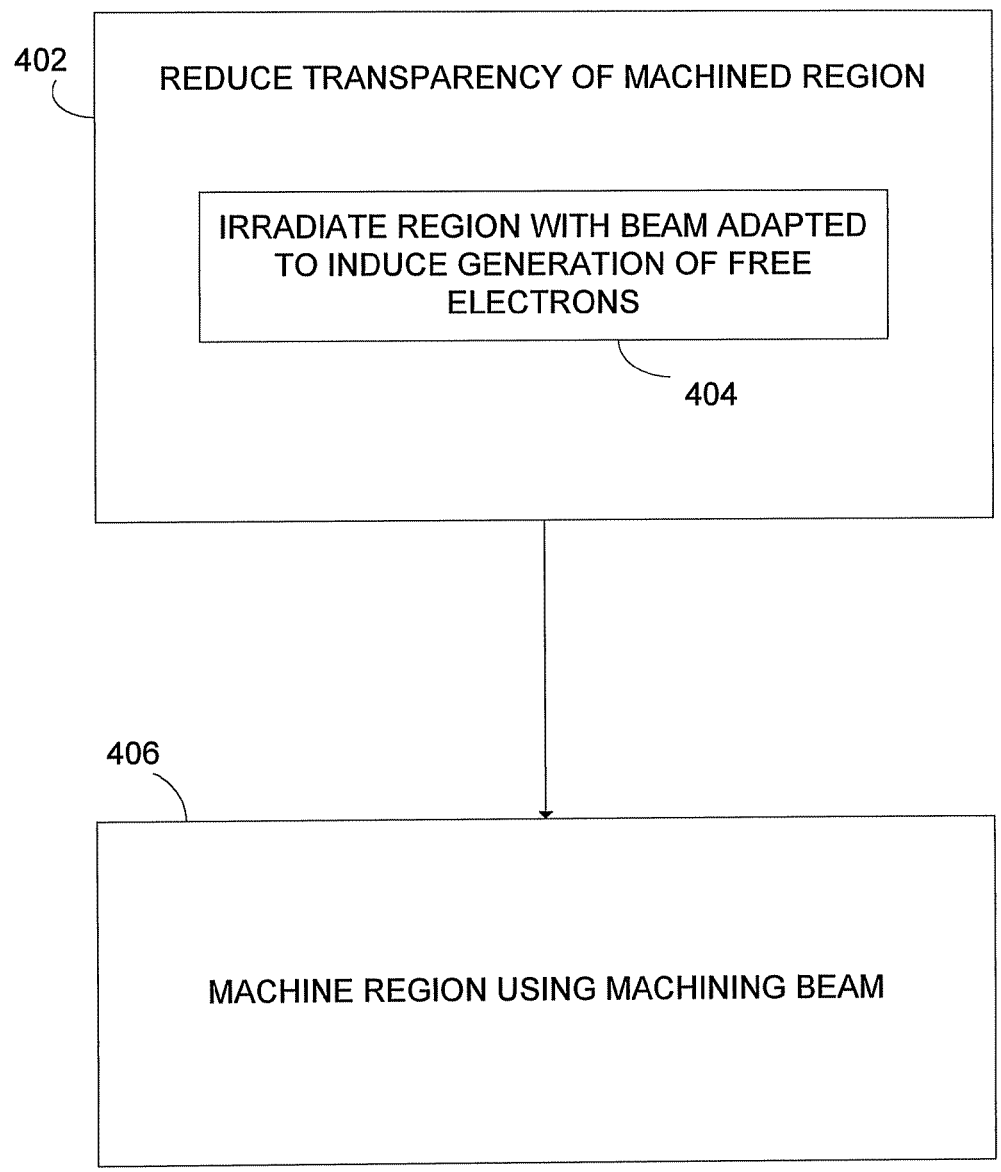
FIG. 4 is a schematic flow-chart illustration of a method of machining, in accordance with some demonstrative embodiments.

Reference is now made to FIG. 4, which schematically illustrates a flow-chart of a machining method to remove material in a machined region. In some non-limiting embodiments, one or more operations of the method of FIG. 4 may be performed by system 11 (FIG. 1), system 31 (FIG. 2), and/or system 41 (FIG. 3).

As indicated at block 402, the method may include reducing transparency of the machined region to at least a predefined wavelength.

As indicated at block 404, reducing the transparency may include reducing the transparency of the region by irradiating the region with a first beam of photons to induce generation of free electrons in the region. For example, beam source 14 (FIG. 1) may generate beam 16 (FIG. 1) to irradiate region 24 (FIG. 1) and/or region 36 (FIG. 3) to induce generation of free electrons in region 24 (FIG. 1) and/or region 36 (FIG. 3), e.g., as described above.

As indicated at block 406, the method may also include machining the region with a second beam of photons having the predefined wavelength. For example, beam source 10 (FIG. 1) may generate beam 12 (FIG. 1) to machine region 24 (FIG. 1) and/or region 36 (FIG. 3), e.g., as described above.

In some embodiments, the method may include reducing the transparency of the region from a first transparency level, in which the region is substantially transparent to the wavelength of the second beam, to a second transparency level, in which the region is to absorb at least part of the second beam of photons, e.g., as described above.

In some embodiments, the method may include irradiating the region with a beam of photons having energy equal to or greater than an energy band gap of the material, e.g., as described above.

In some demonstrative embodiments, the method may include jointly directing the first and second beams to the region. In one example, the first and second beams may be jointly inserted into a column of water directed to the region, e.g., as described above with reference to FIG. 3. In another example, the first and second beams may be combined by a dichroic mirror, e.g., as described above with reference to FIG. 1.

In some demonstrative embodiments, the method may include individually directing the first and second beams to first and second, at least partially overlapping, respective portions of the region, e.g., as described above with reference to FIG. 2.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

The invention claimed is:

1. A machining method to remove material in a region, the method comprising:
   irradiating said region with a first beam of photons configured to increase absorption of at least a predefined wavelength by said region, wherein the first beam of photons includes photons with an energy equal to or greater than a band-gap energy of said material of said region, to be absorbed by said material of said region and to induce generation of free electrons in said region by transferring electrons from a valence band to a conduction band of said material of said region; and
   machining said region with a second beam of photons having said predefined wavelength, which is absorbed by said region in response to said generation of said free electrons.

2. The method of claim 1, wherein said first beam of photons is configured to reduce the transparency of said region from a first transparency level, in which said region is substantially transparent to said wavelength, to a second transparency level, in which said region absorbs at least part of said second beam of photons.

3. The method of claim 1 comprising jointly directing said first and second beams to said region.

4. The method of claim 3 comprising inserting said first and second beams into a column of water directed to said region.

5. The method of claim 1 comprising individually directing said first and second beams to first and second, at least partially overlapping, respective portions of said region.

6. The method of claim 1, wherein at least one of said first and second beams comprises a pulsed beam.

7. The method of claim 6, wherein said first and second beams comprise first and second interlaced pulsed beams.

8. The method of claim 1, wherein machining said region comprises machining a first layer of said material on top of a second layer of another material, wherein said first layer is substantially transparent to said wavelength, and wherein said second layer is at least partially opaque to said wavelength.

9. The method of claim 8, wherein said first layer comprises cubic zinc sulfide, and wherein said second layer comprises cadmium zinc telluride.

10. The method of claim 1, wherein machining said region with a second beam of photons comprises machining said region with a laser beam.

11. The method of claim 1, wherein said material comprises a semiconductor.

12. The method of claim 11, wherein said semiconductor comprises cubic-zinc-sulfide.

13. The method of claim 12, wherein said first beam has a wavelength of no more than 350 nanometers.

14. A machining system to remove material in a region, the system comprising:
   a first beam source to generate a first beam of photons to irradiate said region, wherein said first beam is configured to increase absorption of at least a predefined wavelength by said region, wherein the first beam of photons includes photons with an energy equal to or greater than a band-gap energy of said material of said region, to be absorbed by said material of said region and to induce generation of free electrons in said region by transferring electrons from a valence band to a conduction band of said material of said region; and a second beam source to generate a second beam of photons having said predefined wavelength, which is absorbed by said region in response to said generation of said free electrons, to machine said region.

15. The system of claim 14, wherein said first beam is adapted to reduce the transparency of said region from a first transparency level, in which said region is substantially transparent to said wavelength, to a second transparency level, in which said region absorbs at least part of said second beam of photons.

16. The system of claim 14, comprising a combiner to jointly direct said first and second beams to said region.

17. The system of claim 16, wherein said combiner comprises a water-beam combiner to insert said first and second beams into a column of water directed to said region.

18. The system of claim 17, wherein said combiner comprises a dichroic mirror.

19. The system of claim 14, wherein at least one of said first and second beams comprises a pulsed beam.

20. The system of claim 19, wherein said first and second beams comprise first and second interlaced pulsed beams.

21. The system of claim 14, wherein said region comprises a first layer of said material on top of a second layer of another material, wherein said first layer is substantially transparent to said wavelength, and wherein said second layer is at least partially opaque to said wavelength.

22. The system of claim 21, wherein said first layer comprises cubic zinc sulfide, and wherein said second layer comprises cadmium zinc telluride.

23. The system of claim 14, wherein said second beam source comprises a laser.

24. The system of claim 14, wherein said material comprises a semiconductor.

25. The system of claim 24, wherein said semiconductor comprises cubic-zinc-sulfide.

26. The system of claim 25, wherein said first beam has a wavelength of no more than 350 nanometers.

* * * * *